United States Patent [19]

Irie

[11] Patent Number: 5,776,508

[45] Date of Patent: Jul. 7, 1998

[54] APPARATUS FOR LOADING OF GREEN TIRE ON BLADDERLESS TIRE VULCANIZER

[75] Inventor: Nobuhiko Irie, Nogasaki, Japan

[73] Assignee: Mitsubishi Jukogyo Kabushiki Kaisha, Tokyo, Japan

[21] Appl. No.: 733,766

[22] Filed: Oct. 18, 1996

Related U.S. Application Data

[62] Division of Ser. No. 390,997, Feb. 21, 1995, Pat. No. 5,597,429.

[30] Foreign Application Priority Data

Feb. 24, 1994 [JP] Japan .................... 6-026828

[51] Int. Cl.$^6$ ............................ B29D 30/06; B29C 31/08
[52] U.S. Cl. ........................ 425/36; 156/394.1; 425/38; 425/58
[58] Field of Search .................. 156/406.2, 396, 156/421.6, 421.8, 403, 111, 130.5, 135; 425/36, 38, 58; 254/50.1, 50.4, DIG. 10; 294/93–97; 157/1.2, 1.17

[56] References Cited

U.S. PATENT DOCUMENTS

| | | | |
|---|---|---|---|
| 1,922,740 | 8/1933 | Matchey | 254/50.4 |
| 3,393,807 | 7/1968 | Sylvester et al. | 294/93 |
| 3,401,973 | 9/1968 | Marshall | 294/93 |
| 3,659,975 | 5/1972 | Leblond | |
| 3,845,979 | 11/1974 | Schatz et al. | 425/38 |
| 4,236,883 | 12/1980 | Turk et al. | |
| 4,600,370 | 7/1986 | Kaneko et al. | |
| 5,127,811 | 7/1992 | Trethowan | 425/38 |

FOREIGN PATENT DOCUMENTS

| | | |
|---|---|---|
| 368 546A1 | 5/1990 | European Pat. Off. |
| 57-148638A | 9/1982 | Japan |
| 59-57733A | 4/1984 | Japan |
| 3-253310 | 12/1991 | Japan |
| 67379 | 4/1973 | Luxembourg |
| 827006 | 1/1960 | United Kingdom |

*Primary Examiner*—Geoffrey L. Knable
*Attorney, Agent, or Firm*—Jacobson, Price, Holman & Stern, PLLC

[57] ABSTRACT

A method of loading a green tire on a bladderless tire vulcanizer of the inside gripping type and an apparatus thereof, in which both bead portions of the green tire can be inserted into respective bead rings of a mold accurately and reliably. The constitution is such that, on a bladderless tire vulcanizer having a pair of upper and lower pressing members 8 and 9 in opposition to the upper and lower bead rings of tire molds and capable of being expanded and shrunken to mold the inner surfaces of the bead portions of the tire, a green tire is supplied to a position above a lower mold 4 from above the shrunken pressing members 8 and 9 while the inside of the upper bead portion of the green tire is gripped; the pressing members 8 and 9 are interposed between the upper and lower beads of the green tire whose upper bead portion is gripped; the pressing members 8 and 9 are expanded radially; the gripping of the green tire is released; the green tire is shifted to the pressing members 8 and 9; the pressing members 8 and 9 are lowered; and the lower bead portion of the green tire is seated on the lower bead ring 5 portion of the lower mold.

3 Claims, 9 Drawing Sheets

APPARATUS FOR LOADING OF GREEN TIRE ON BLADDERLESS TIRE VULCANIZER

This is a Divisional of application Ser. No. 08/390,997 filed Feb. 21, 1995, now U.S. Pat. No. 5,597,429.

BACKGROUND OF THE INVENTION

The present invention relates to a method of loading a green tire, which is applied to a tire vulcanizer of a vulcanization system without a bladder, and an apparatus therefor.

The known tire vulcanizers are divided into two types: (1) a type in which a heating/pressurizing medium is introduced into a tire via a bladder when the tire is vulcanized, and (2) a bladderless type in which a heating/pressurizing medium is directly introduced into a tire when the tire is vulcanized. In the case of the latter tire vulcanizer of the bladderless type, when the diameter is increased to form the inner side of the bead portion including the bead toe portion of the tire, a ring-shaped pressing member is arranged in opposition to the bead ring portion of a tire mold.

In loading a green tire into a tire mold, an inside gripping type is desirable, in which the upper bead portion of the green tire is gripped from the inside from the viewpoint of tire quality.

A related art for a green tire loading apparatus of this inside gripping type is shown in FIGS. 5 to 10 (refer to Japanese Patent Provisional Publication No. 3-253310 (No. 253310/1991), if necessary).

Figure 5:
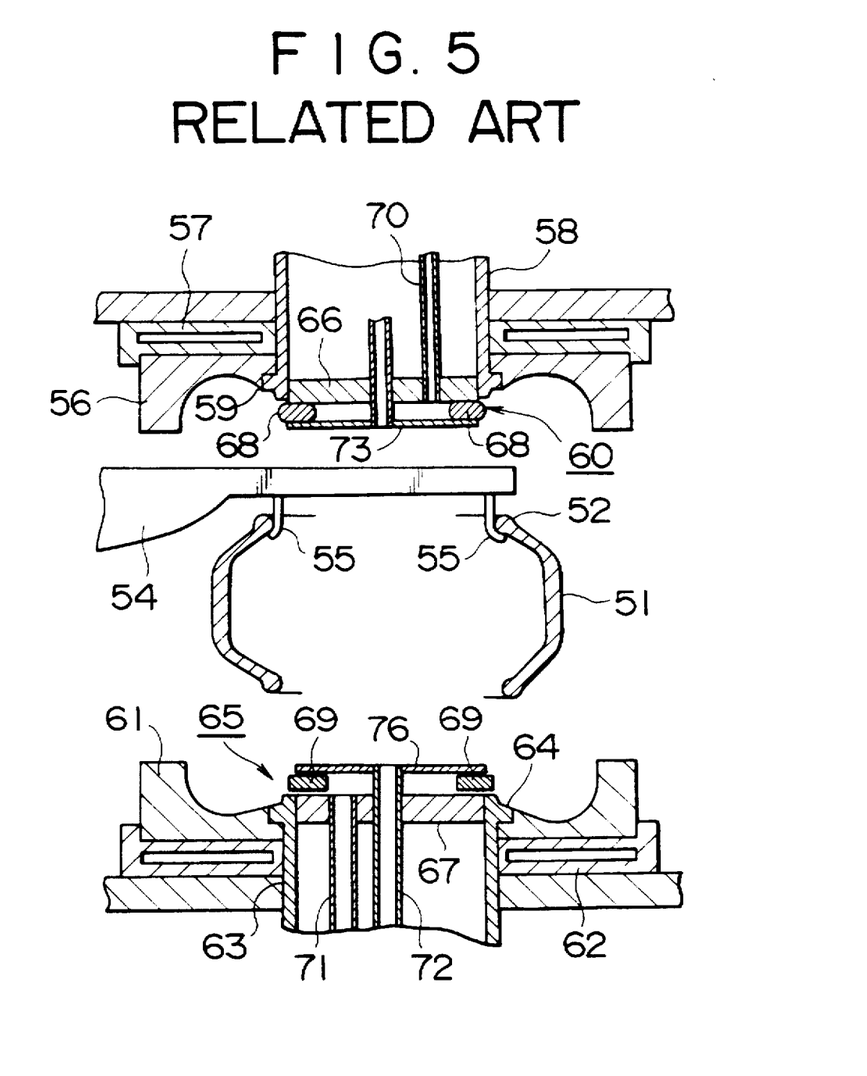
FIG. 5 is a view for illustrating a first work process of an inside gripping type green tire loading apparatus of the related art.

In order to load a green tire, an upper mold 56 is raised to an upper opening position, and an upper bead portion 52 of the green tire 51 is gripped from the inside by means of inside gripping chucks 55 of an inside gripping loader 54 as shown in FIG. 5. Then, the green tire 51 is inserted between the upper mold 56 and a lower mold 61, and the center of the green tire 51 is aligned with the center position of the upper and lower molds 56 and 61.

Figure 6:
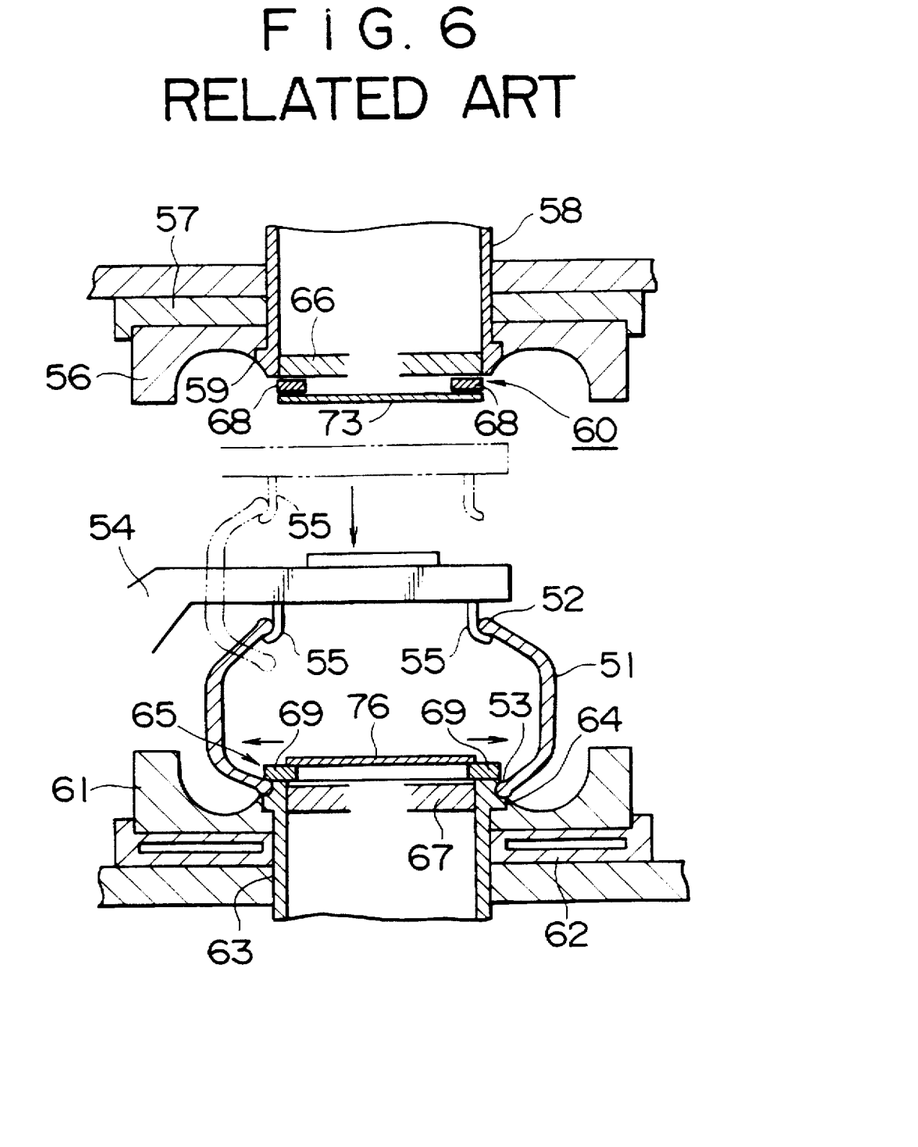
FIG. 6 is a view for illustrating a second work process of an inside gripping type green tire loading apparatus of the related art.

Subsequently, as shown in FIG. 6, the inside gripping loader 54 is lowered, a lower bead portion 53 of the green tire 51 is aligned with a lower bead ring 64, and then the lower bead portion 53 is held and sealed by a lower bead holding portion 65 of a central mechanism 63. The inside gripping chucks 55 of the inside gripping loader 54 are removed from the upper bead portion 52 of the green tire 51. Then, the inside gripping loader 54 is raised and turned to retract from between the upper and lower molds 56 and 61.

Figure 7:
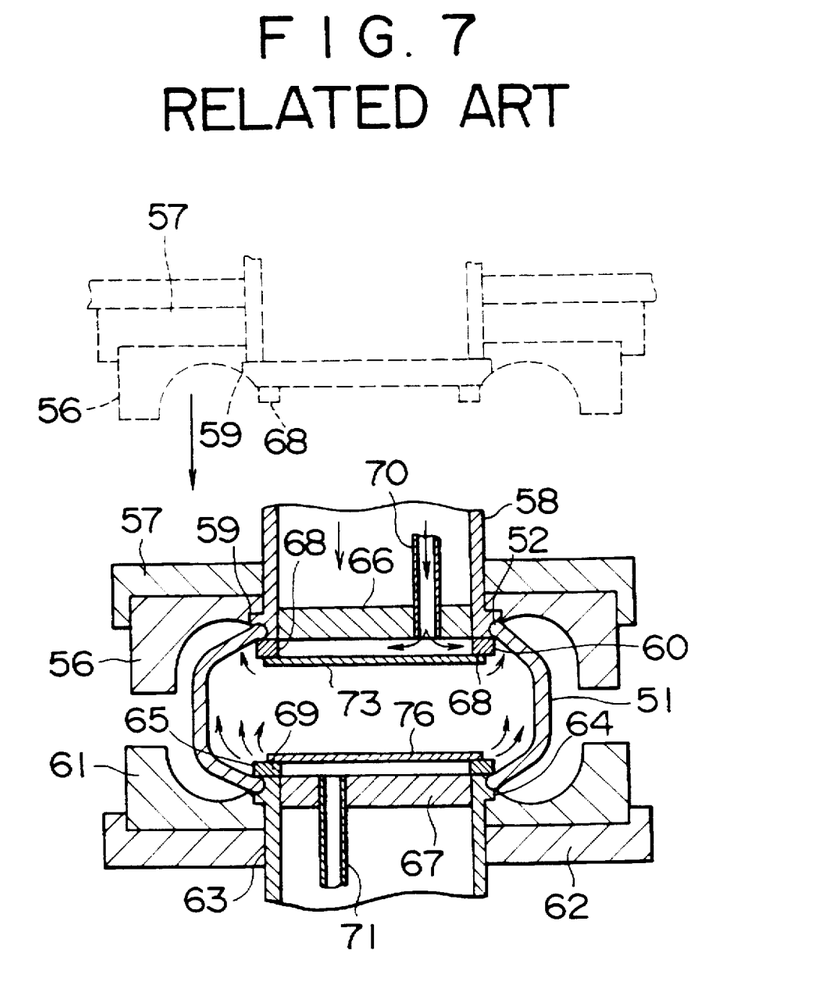
FIG. 7 is a view for illustrating a third work process of an inside gripping type green tire loading apparatus of the related art.

Subsequently, as shown in FIG. 7, the upper mold 56 and an upper central mechanism 58 are lowered halfway so that the upper bead portion 52 of the green tire 51 comes in contact with an upper bead ring 59. Then, a low-pressure heating medium is supplied into the green tire 51 through supply pipes 70 and 71. Thereupon, the upper bead portion 52 of the green tire 51 is raised to fit the upper ring 59. Then, the upper bead portion 52 is held and sealed by an upper bead holding portion 60.

Figure 8:
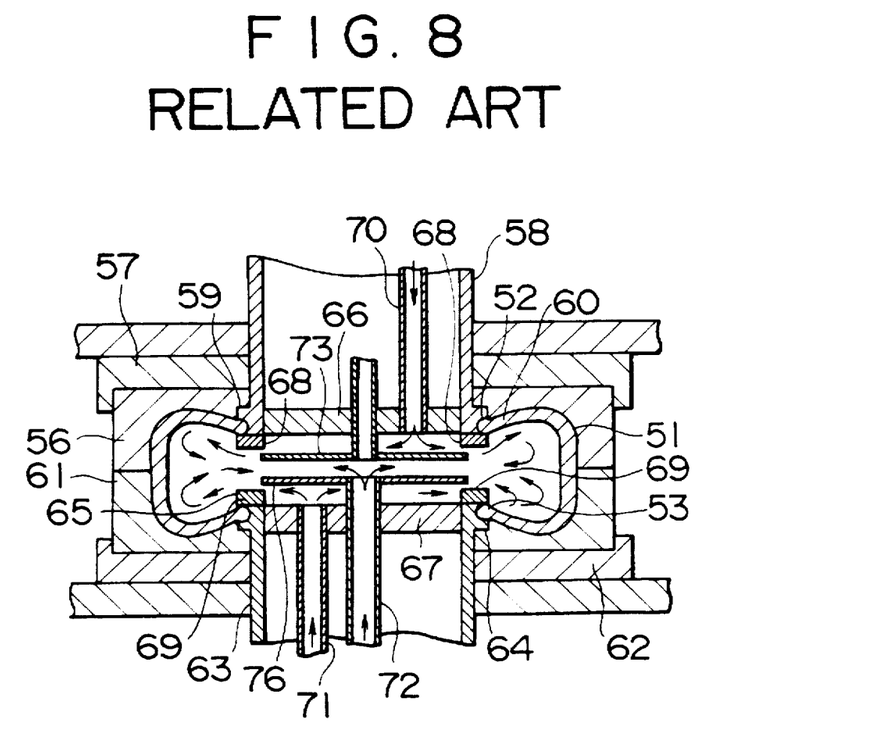
FIG. 8 is a view for illustrating a fourth work process of an inside gripping type green tire loading apparatus of the related art.

Subsequently, as shown in FIG. 8, the upper mold 56 is lowered, and the upper and lower molds are tightened with each other. Then, a high-pressure heating medium is supplied into the green tire 51 through supply pipes 70 and 71. This high-pressure heating medium is applied directly to the inner surface of the green tire 51 to accomplish vulcanization molding.

Figure 9:
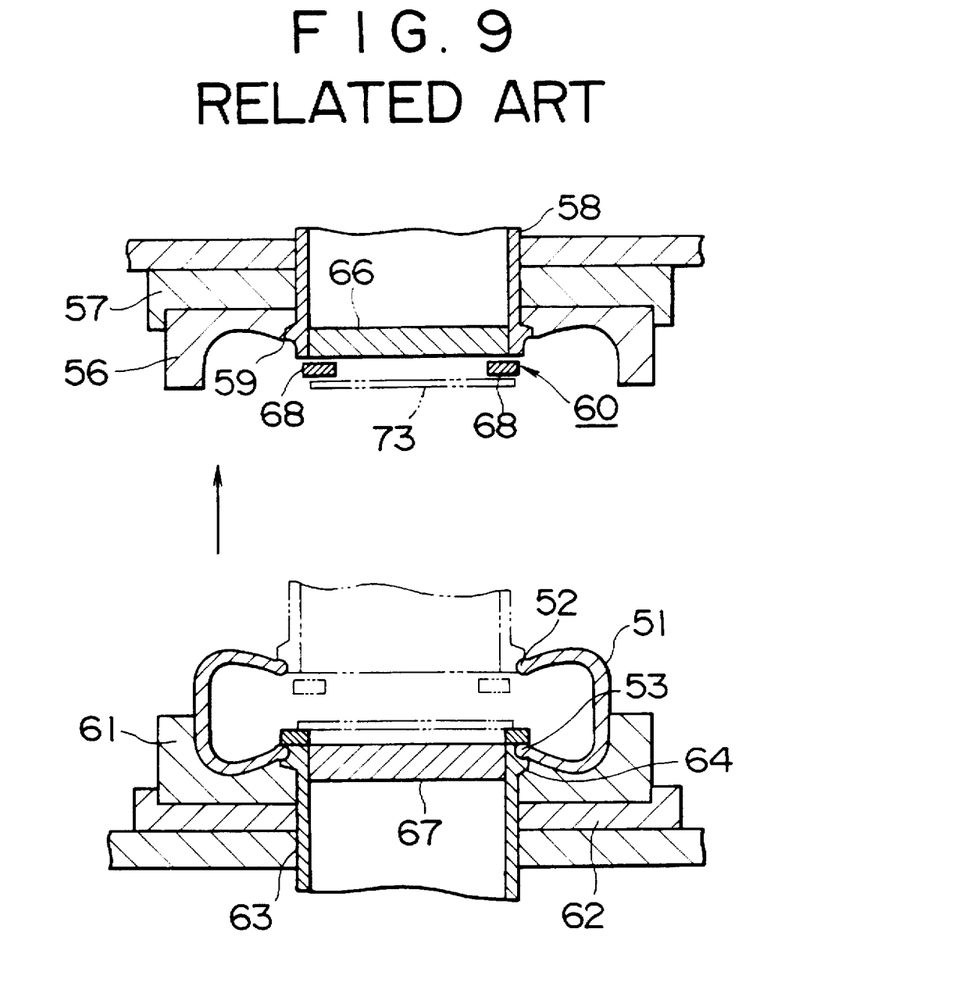
FIG. 9 is a view for illustrating a fifth work process of an inside gripping type green tire loading apparatus of the related art.

Upon completion of vulcanization molding, the holding of the upper bead portion 52 by means of the upper bead holding portion 60 is released, and the upper mold 56 and the upper central mechanism 58 are raised as shown in FIG. 9.

Figure 10:
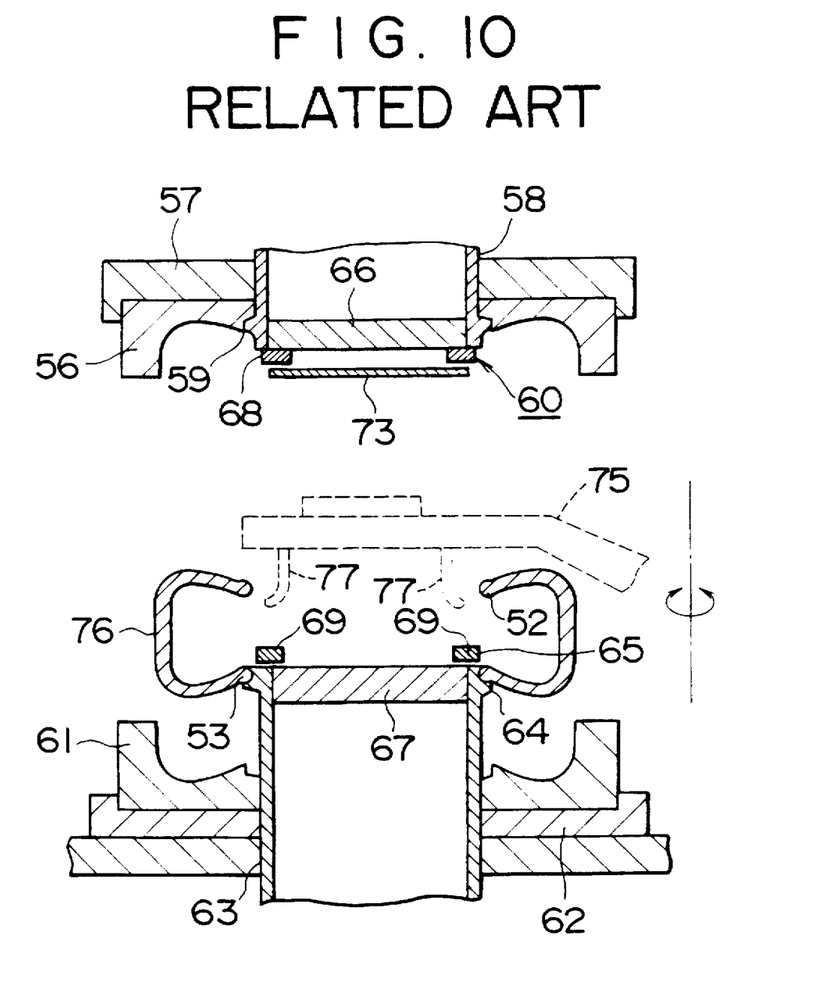
FIG. 10 is a view for illustrating a sixth work process of an inside gripping type green tire loading apparatus of the related art.

Subsequently, as shown in FIG. 10, an unloader 75 is inserted between the upper and lower molds 56 and 61, and the lower central mechanism 63 is raised to remove the vulcanized tire 76 from the lower mold 61. Then, the upper bead portion 52 of the vulcanized tire 76 is gripped from the inside by means of inside gripping chucks 77 of the unloader 75, and the holding of the lower bead portion 53 by the lower bead holding portion 65 is released. After that, the unloader 75 is turned to take the vulcanized tire 76 out of the tire vulcanizer.

However, the conventional green tire loading apparatus of the inside gripping type, shown in FIGS. 5 to 10, has the following problem: Since the temperature of the tire mold is approximately 200° C., and the green tire material acquires a softening property upon being heated, the sidewall portion of the tire is heated, and collapsed if the time between holding of the lower bead portion by the lower central mechanism and holding of the upper bead portion by the upper central mechanism is prolonged. As a result, the upper bead portion is misaligned, or erroneous holding occurs, so that both bead portions of the green tire are not inserted into the respective bead rings accurately and reliably.

SUMMARY OF THE INVENTION

The present invention was made to solve the above problem. Accordingly, an object of the present invention is to provide a method of loading a green tire on a bladderless tire vulcanizer of the inside gripping type and an apparatus thereof, in which both bead portions of the green tire can be inserted into respective bead rings of a mold accurately and reliably.

To achieve the above object, the method of loading a green tire on a bladderless tire vulcanizer in accordance with the present invention is characterized in that, on a bladderless tire vulcanizer having a pair of upper and lower pressing members in opposition to the upper and lower bead rings of tire molds and capable of being expanded and shrunken to mold the inner surfaces of the bead portions of the tire, the method comprises the steps of: supplying a green tire to a position above a lower mold in axial alignment with the lower mold from above the pressing members shrunken radially while the inside of the upper bead portion of the green tire is gripped by a gripping device; interposing the pressing members between the upper and lower beads of the green tire whose upper bead portion is gripped; expanding the pressing members radially; releasing the gripping of the green tire; shifting the green tire to the pressing members; lowering the pressing members; and seating the lower bead portion of the green tire on the lower bead ring portion of the lower mold.

The green tire loading apparatus for a bladderless tire vulcanizer in accordance with the present invention is characterized in that, on a bladderless tire vulcanizer having a pair of upper and lower pressing members in opposition to the upper and lower bead rings of tire molds and capable of being expanded and shrunken to mold the inner surfaces of the bead portions of the tire, the apparatus has a gripping device with a plurality of gripping claws capable of moving inward and outward to supply a green tire while gripping the green tire, wherein, of the gripping claws, at least three gripping claws can be moved inward and outward independently of the inward and outward movement of other gripping claws.

The operation of the present invention configured as described above is such that on a bladderless tire vulcanizer having a pair of upper and lower pressing members in opposition to the upper and lower bead rings of tire molds and capable of being expanded and shrunken to mold the inner surfaces of the bead portions of the tire, a green tire is supplied to a position above a lower mold from above the pressing members shrunken radially while the inside of the upper bead portion of the green tire is gripped; the pressing members are interposed between the upper and lower beads of the green tire whose upper bead portion is gripped; the pressing members are expanded radially; the gripping of the green tire is released; the green tire is shifted to the pressing members; the pressing members are lowered; and the lower bead portion of the green tire is seated on the lower bead ring portion of the lower mold.

Thus, the present invention achieves the following effect: The upper bead portion is supported by the upper pressing member during the time between the insertion of the lower bead portion of the green tire into the lower bead ring and the insertion of the upper bead portion of the green tire into the upper bead ring. Therefore, even if the portion in contact with the lower bead ring of the green tire and the nearby portion are heated and softened by the heat of the mold etc., there is no possibility of collapsing, so that both bead portions of the green tire can be inserted in the respective bead rings accurately and reliably.

DESCRIPTION OF A PREFERRED EMBODIMENT

One embodiment of a green tire loading apparatus applied to a method of loading a green tire on a bladderless tire vulcanizer in accordance with the present invention will be described with reference to FIGS. 1 to 4.

Figure 1:
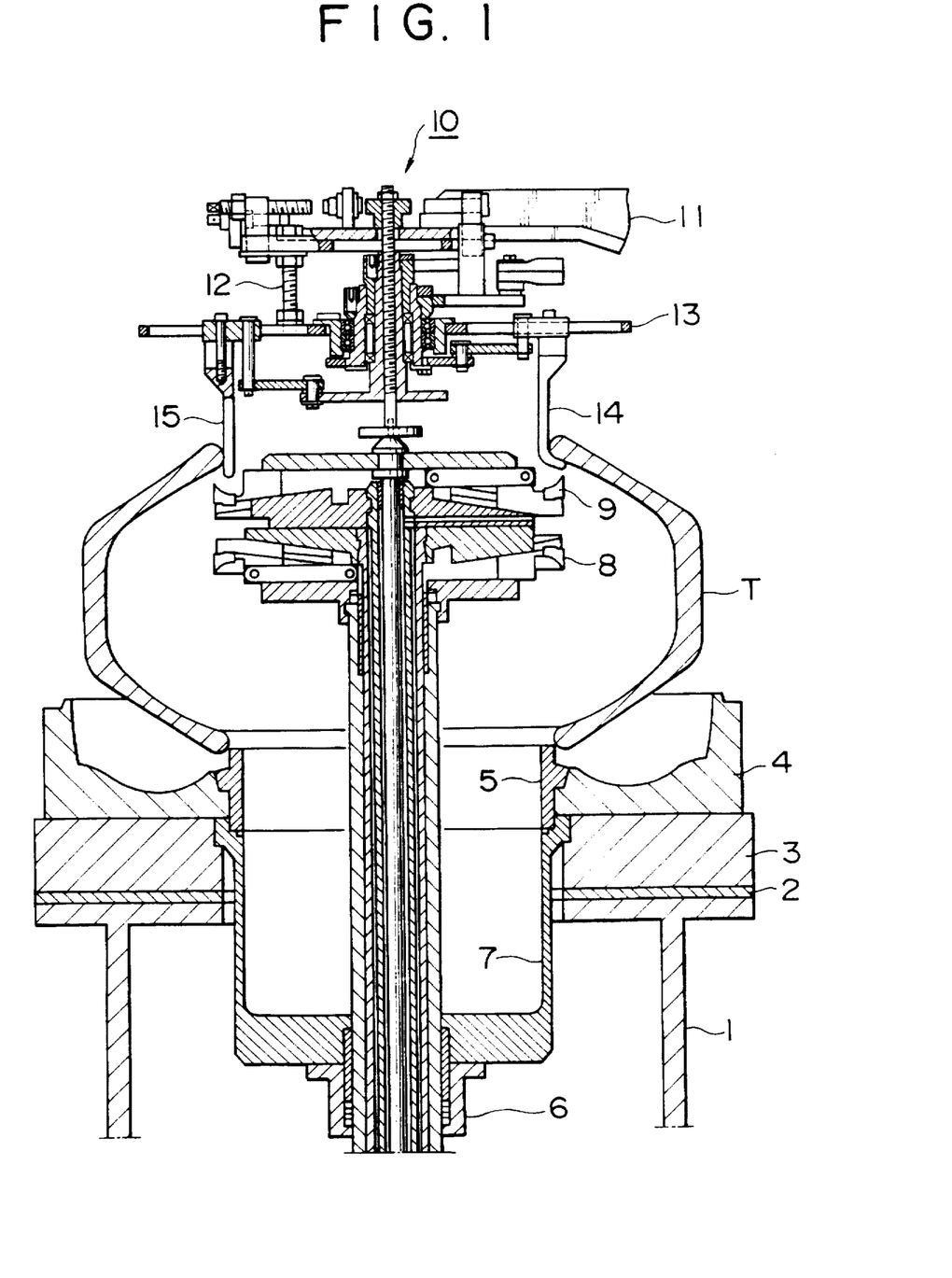
FIG. 1 is a longitudinal sectional view of a green tire loading apparatus applied to a method of loading a green tire on a bladderless tire vulcanizer in accordance with the present invention.

In FIG. 1, reference numeral 1 denotes a frame of the tire vulcanizer, 3 denotes a lower hot plate assembled to the frame via a heat insulating plate 2, 4 denotes a tire mold (a lower mold) bolted to the lower hot plate 3, 5 denotes a lower bead ring fixed to the lower mold 4, and 6 denotes a lower central mechanism suspended from the lower hot plate 3 via an external cylinder 7. In addition, this tire vulcanizer has an upper mold, an upper bead ring, an upper hot plate, an upper mold elevating mechanism, etc., but these elements are not shown in the figure.

Reference numerals 8 and 9 denote a pair of upper and lower pressing members which are in opposition to the upper and lower bead rings and mold the inner surface of the tire bead portion. The pressing members 8 and 9 are divided into a plurality of segments in the circumferential direction, and bolted to the lower central mechanism 6. They can be expanded and shrunken in the radial direction by the action of the lower central mechanism 6. When expanded, they acquire a ring shape. The upper pressing member 9 and the lower pressing member 8 can be raised and lowered individually.

Reference numeral 11 denotes an arm of a green tire supplying device (usually called a loader) assembled to the frame 1 in such a manner as to be movable vertically and horizontally, and 10 denotes a green tire gripping device assembled to the tip end of the arm 11.

Figure 2:
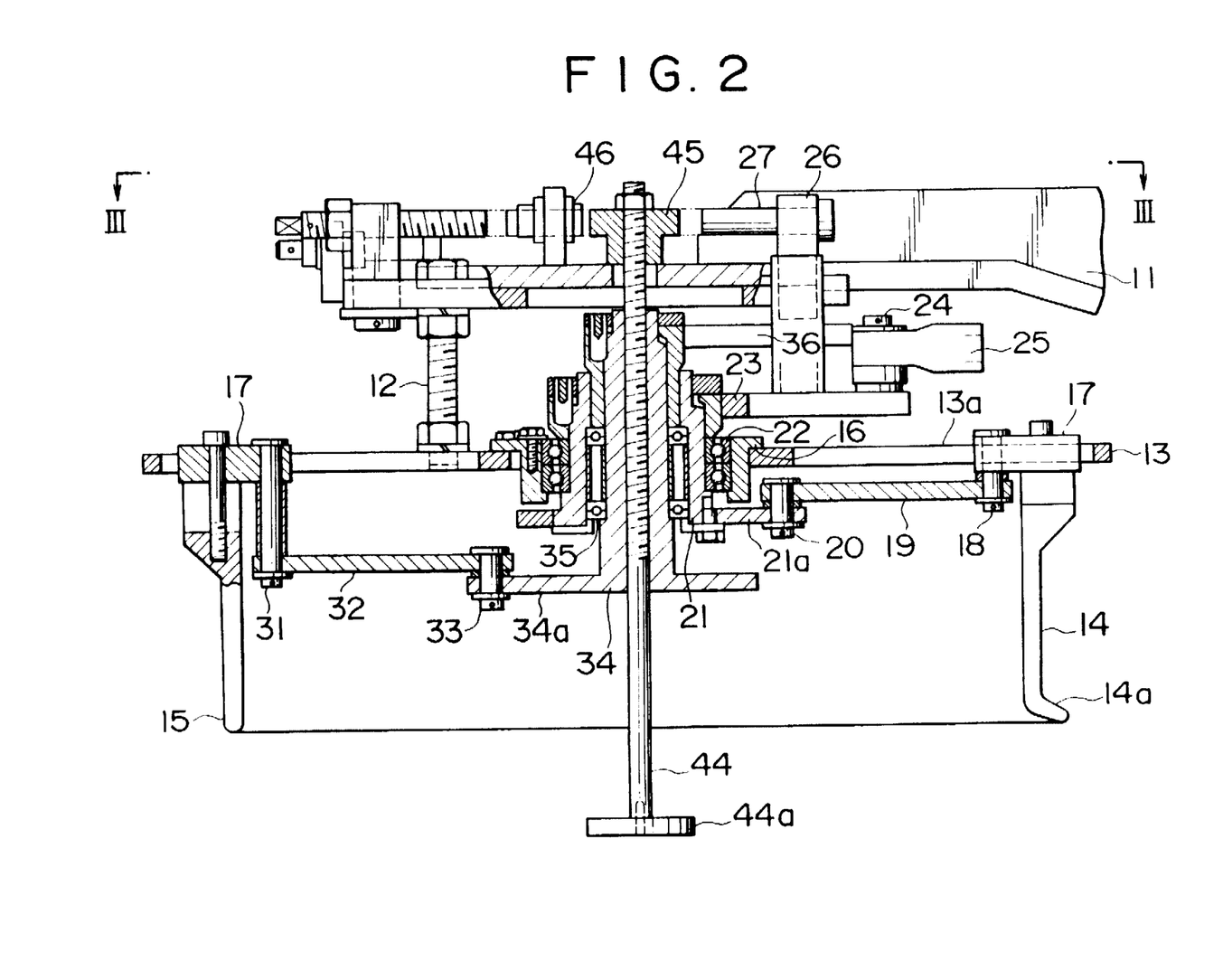
FIG. 2 is an enlarged longitudinal sectional view of a green tire gripping device.
Figure 3:
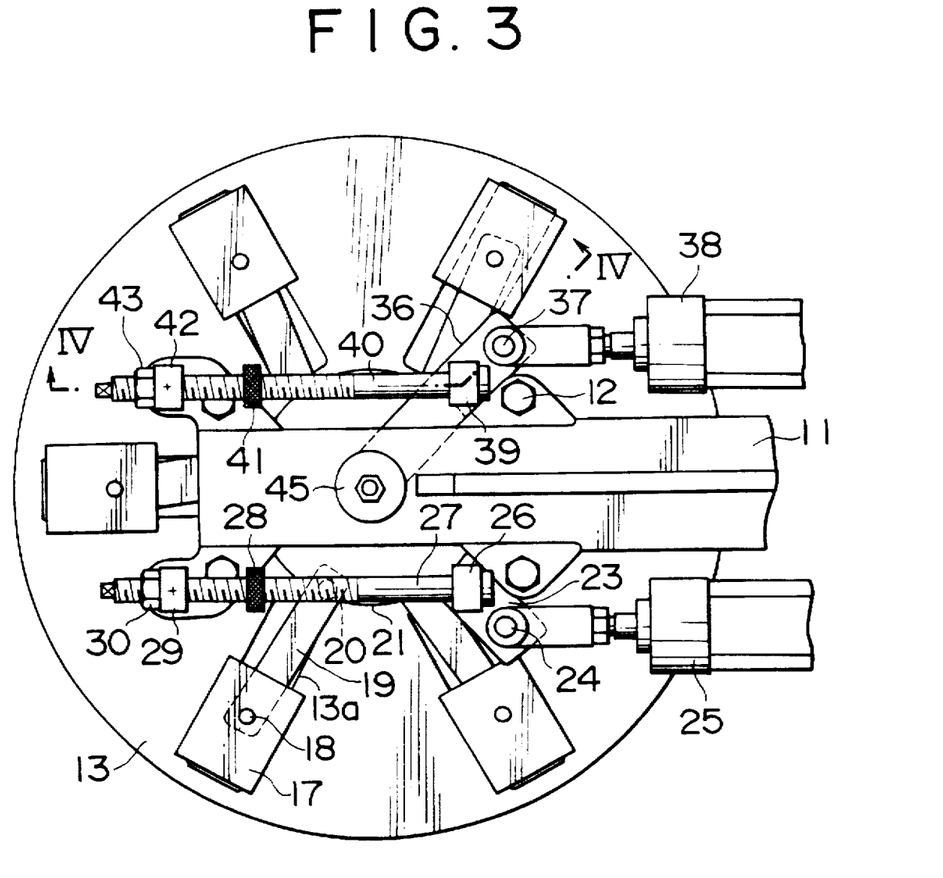
FIG. 3 is a plan view taken along the line III—III of FIG. 2.
Figure 4:
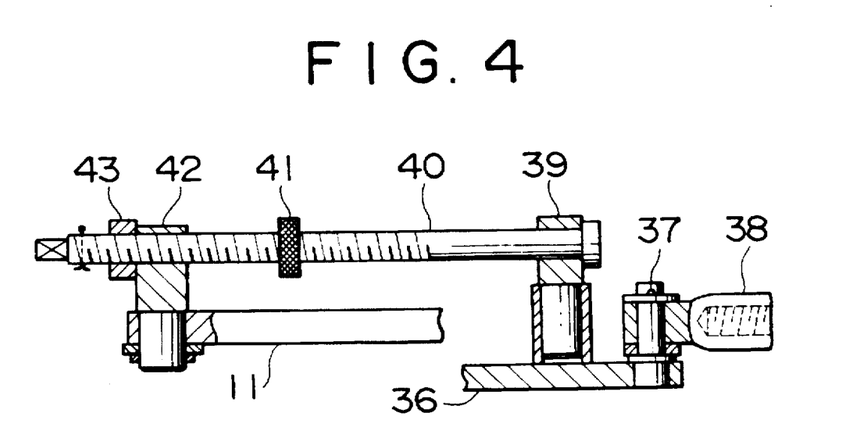
FIG. 4 is a longitudinal side view taken along the line IV—IV of FIG. 3.

Referring to FIGS. 2 and 3, the green tire gripping device 10 includes a disk 13 fixed to the arm 11 by a plurality of bolts 12, blocks 17 slidably inserted into a plurality of guide grooves (six guide grooves in this embodiment at substantially equal in intervals) formed radially in the disk 13, first gripping claws 14 bolted to alternate blocks 17 and having a bent portion 14a at the distal end thereof, second gripping claws 15 bolted to other blocks 17 and having no bent portion at the distal end thereof, a bearing box 16 bolted to the inner peripheral portion of the disk 13, a shaft 21 rotatably supported via a bearing 22 inserted in the bearing box 16, links 19 each of which connects a flange 21a formed at the lower end of the shaft 21 to the block 17 having the first gripping claw 14 via pins 18 and 20, an air cylinder 25 assembled between the tip end of an arm 23 fixed to the upper end of the shaft 21 and the arm 11 via a pin 24 and a not illustrated pin, a shaft 34 rotatably inserted in the inside of the shaft 21 via a bearing 35, links 32 each of which connects a flange 34a formed at the lower end of the shaft 34 to the block 17 having the second gripping claw 15 via pins 31 and 33, an air cylinder 38 assembled between the tip end of an arm 36 fixed to the upper end of the shaft 34 and the arm 11 via a pin 37 and a not illustrated pin, and an opening limit restricting mechanism for the first and second gripping claws 14 and 15.

The opening limit restricting mechanism includes a pin 26 (or a pin 39) rotatably assembled to the arm 23 (the arm 36), a bolt 27 (or a bolt 40) inserted into a hole formed at the upper end portion of the pin 26 (or the pin 39), a pin 29 (or a pin 42) rotatably attached to the arm 11, a lock nut 30 (or a lock nut 43) for providing a locking function when screwed to the tip end of the bolt 27 (or the bolt 40) screwed to the upper end of the pin 29 (or the pin 42), and an adjusting nut 28 (or an adjusting nut 41) screwed at the intermediate portion of the bolt 27 (or the bolt 40). The opening limit restricting mechanism is configured so that the pitch circle diameter of the opened gripping claw 14 (or gripping claw 15) can be changed by changing the position of the adjusting nut 28 (or the adjusting nut 41).

The tire gripping device 10 has a detecting device for detecting the upper end of the lower central mechanism 6 consisting of a sensor 46 and a shaft 44 which is inserted in the shaft 34 in such a manner as to move vertically and has a flange 44a at the lower end thereof and a block 45 at the upper end thereof, a tire gripping detecting device (not shown), a safety device, etc.

Next, the operation of the green tire loading apparatus for a bladderless tire vulcanizer, shown in FIGS. 1 to 4, will be described in detail.

The upper bead portion of a green tire is gripped from the inside beforehand by means of the first and second gripping claws 14 and 15 of the gripping device 10, and the pressing members 8 and 9 are shrunken radially and moved close to each other. At this time, the upper mold is kept at a raised position.

After the gripping device 10 is moved in axial alignment with the lower mold 4, the lower bead portion of the green tire T is lowered to a position of an appropriate height above the lower bead ring 5.

After the pressing members 8 and 9 are moved vertically so as to be positioned between both bead portions of the green tire T, the pressing members 8 and 9 are expanded radially. If necessary, the upper pressing member 9 is raised to a position where the upper pressing member 9 does not interfere with the gripping claws 14 and 15 of the gripping device 10 (refer to FIG. 1).

Next, the cylinder 25 is operated to turn the shaft 21, and the first gripping claws 14 having a bent portion at the lower end thereof are retracted inward via links 19. Thereby, the tire T is lowered, while keeping the axial alignment with the lower mold 4, by being guided by the second gripping claws 15.

Upon completion of the lowering of the tire T onto the upper pressing member 9, the cylinder 38 is operated to retract the second gripping claws 15 inward via the shaft 34 and the links 32.

Then, the lower pressing member 8 is lowered until it comes in contact with the lower bead portion of the tire T. The upper pressing member 9 is lowered if necessary, and the lower pressing member 8 is lowered, so that the lower bead portion of the green tire T is seated on the lower bead ring 5, and pushed into the lower bead ring 5.

Then, the upper mold is lowered, so that the upper bead portion of the green tire T is seated on the upper bead ring, and pushed into the upper bead ring.

Next, the molding process in which the upper and lower molds are closed is started while a molding gas (inert gas or low-pressure steam) is introduced into the green tire T. After the upper and lower molds have been closed, a heating/pressurizing medium is introduced into the tire T so that the heating process is started.

As described above, according to the present invention, the green tire T is shifted from the green tire gripping device 10 to the upper pressing member 9 concentrically, and the upper bead portion is supported by the upper pressing member 9 even during the time between the insertion of the lower bead portion of the green tire T into the lower bead ring 5 and the insertion of the upper bead portion of the green tire T into the upper bead ring. Therefore, even if the portion in contact with the lower bead ring of the green tire T and the nearby portion are heated and softened by the heat of the mold etc., there is no possibility of collapsing, so that both bead portions of the green tire T can be inserted in the respective bead rings accurately and reliably.

I claim:

1. A green tire loading apparatus for a bladderless tire vulcanizer, for gripping a green tire using a plurality of expanded grip claws and then loading said green tire onto said bladderless tire vulcanizer, said bladderless vulcanizer having a pair of upper and lower pressing members expandable and shrinkable and movable upwards and downwards for molding inner surfaces of bead portions of a tire, opposite to upper and lower bead rings of upper and lower tire molds, said green tire loading apparatus comprising:

an arm and a disk fixed to the arm for loading of the green tire;

a plurality of blocks being arranged slidably in a radial direction of said disk and at intervals on a circumference of said disk;

first grip claws having a bent portion at a distal end thereof and second grip claws being substantially straight at a distal end thereof, said first claws and said seconds claws being alternately fixed to each of said blocks;

a first driving means for moving said first grip claws in the radial direction of said disk via said blocks to which said first grip claws are fixed respectively; and a second driving means for moving said second grip claws in the radial direction of said disk via said blocks to which said second grip claws are fixed respectively;

wherein when said green tire is gripped by said first and second grip claws said first and second grip claws are in an expanded condition, and when said green tire is loaded onto a vulcanizer, said first driving means moves said first grip claws into a shrunken condition which releases said gripping of said green tire by said first grip claws, and at the same time, said second grip claws guide said green tire into a loaded position on said vulcanizer.

2. The green tire loading apparatus according to claim 1, further comprising an opening limit restricting mechanism provided in each of said first and second driving means corresponding to a moving range of said first and second grip claws respectively.

3. The green tire loading apparatus according to claim 1, wherein said plurality of blocks are arranged at substantially equal intervals on the circumference of said disk.

* * * * *